(12) United States Patent
Qin et al.

(10) Patent No.: US 11,334,155 B2
(45) Date of Patent: May 17, 2022

(54) SMART GLASSES, METHOD AND DEVICE FOR TRACKING EYEBALL TRAJECTORY, AND STORAGE MEDIUM

(71) Applicant: BEIJING 7INVENSUN TECHNOLOGY CO., LTD., Beijing (CN)

(72) Inventors: Linchan Qin, Beijing (CN); Lin Liu, Beijing (CN); Tongbing Huang, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/059,223

(22) PCT Filed: Apr. 25, 2019

(86) PCT No.: PCT/CN2019/084232
§ 371 (c)(1),
(2) Date: Nov. 26, 2020

(87) PCT Pub. No.: WO2019/233210
PCT Pub. Date: Dec. 12, 2019

(65) Prior Publication Data
US 2021/0208675 A1  Jul. 8, 2021

(30) Foreign Application Priority Data
Jun. 6, 2018  (CN) .......................... 201810574484.9

(51) Int. Cl.
*G06F 3/01*  (2006.01)
*G02B 27/00*  (2006.01)
(Continued)

(52) U.S. Cl.
CPC ......... *G06F 3/013* (2013.01); *G02B 27/0093* (2013.01); *G02B 27/0172* (2013.01);
(Continued)

(58) Field of Classification Search
None
See application file for complete search history.

(56) References Cited

U.S. PATENT DOCUMENTS

| 11,006,100 B1* | 5/2021 | Douglas | ................... G01S 17/89 |
| 2012/0088581 A1* | 4/2012 | Mao | ..................... G06V 40/171 |
| | | | 463/32 |

(Continued)

FOREIGN PATENT DOCUMENTS

| CN | 102547123 A | 7/2012 |
| CN | 104090659 A | 10/2014 |

(Continued)

OTHER PUBLICATIONS

Sugano Yusuke et al. "Self-Calibrating Head-Mounted Eye Trackers Using Egocentric Visual Saliency". User Interface Software & Technology ACM, 2 Penn Plaza, Suite 701 New York NY 10121-0701 USA. Nov. 5, 2015 (Nov. 5, 2015), pp. 363-372, XP058525353.

(Continued)

*Primary Examiner* — Talha M Nawaz
(74) *Attorney, Agent, or Firm* — Gang Yu

(57) ABSTRACT

A pair of smart glasses includes: a frame, a display assembly, an adjustable camera assembly (30), a sensor assembly, and a micro-controller (50). The frame includes a first side frame, a main frame (120) and a second side frame (130) connected in sequence. The main frame is supported in front of the eyes of the wearable device user. The display assembly is fixed on the main frame, and is connected to the micro-controller. The adjustable camera assembly is arranged on the main frame, and is connected to the micro- (Continued)

controller. The sensor assembly is arranged inside the frame, and is connected to the micro-controller. The micro-controller is arranged inside the frame.

11 Claims, 2 Drawing Sheets

(51) Int. Cl.
    *G02B 27/01*     (2006.01)
    *H04N 5/225*     (2006.01)
    *G06T 7/70*     (2017.01)
    *H04N 5/232*     (2006.01)

(52) U.S. Cl.
    CPC .............. *G06F 3/012* (2013.01); *G06T 7/70* (2017.01); *H04N 5/2257* (2013.01); *H04N 5/23299* (2018.08); *G02B 2027/0138* (2013.01); *G02B 2027/0178* (2013.01); *G06T 2207/30201* (2013.01)

(56) References Cited

U.S. PATENT DOCUMENTS

| | | | |
|---|---|---|---|
| 2012/0306725 A1 | 12/2012 | Hilkes | |
| 2013/0235169 A1 | 9/2013 | Kato et al. | |
| 2013/0295994 A1* | 11/2013 | Guitteaud | F16M 13/04 455/556.1 |
| 2014/0293219 A1* | 10/2014 | Haddadi | A61B 3/10 351/204 |
| 2015/0009574 A1 | 1/2015 | Liesecke et al. | |
| 2015/0061995 A1 | 3/2015 | Gustafsson et al. | |
| 2016/0377864 A1* | 12/2016 | Moran | G16H 20/30 345/8 |
| 2017/0053448 A1* | 2/2017 | Kim | G06V 10/25 |
| 2017/0109580 A1 | 4/2017 | Kaehler et al. | |
| 2017/0188823 A1* | 7/2017 | Ganesan | A61B 3/113 |
| 2019/0258325 A1* | 8/2019 | Hui | G06F 3/04842 |

FOREIGN PATENT DOCUMENTS

| | | |
|---|---|---|
| CN | 204883092 U | 12/2015 |
| CN | 105960193 A | 9/2016 |
| CN | 206710716 U | 12/2017 |
| CN | 108732764 A | 11/2018 |
| CN | 208224647 U | 12/2018 |
| JP | H11161188 A | 6/1999 |
| JP | 2012008290 A | 1/2012 |
| JP | 2014504762 A | 2/2014 |
| JP | 2016085350 A | 5/2016 |
| JP | 2016122177 A | 7/2016 |
| JP | 2018010488 A | 1/2018 |
| JP | 2018026120 A | 2/2018 |
| WO | 2012172719 A1 | 12/2012 |
| WO | 2018067357 A2 | 4/2018 |

OTHER PUBLICATIONS

Plopski Alexander et al. "Automated Spatial Calibration of HMD Systems with Unconstrained Eye-cameras". 2016 IEEE International Symposium on Mixed and Augmented Reality (ISMAR), IEEE, Sep. 19, 2016 (Sep. 19, 2016), pp. 94-99, XP033023372A.
First search report of corresponding EP application No. 19815087.2.
First office action of corresponding JP application No. 2020-564920.

* cited by examiner

SMART GLASSES, METHOD AND DEVICE FOR TRACKING EYEBALL TRAJECTORY, AND STORAGE MEDIUM

TECHNICAL FIELD

Embodiments of this application relate to the technical field of wearable devices, and more particularly, to smart glasses, a method and device for tracking eyeball Trajectory, and a storage medium.

BACKGROUND

In recent years, smart glasses have been used by more and more people as revolutionary innovative products and can be used in various fields. Smart glasses integrate a smart phone and a camera, and can perform operations such as uploading pictures, browsing information, sending and receiving text messages, and querying weather and road conditions by tracking the motion trajectory of the user's eyeballs.

When acquiring the motion trajectory of the user's eyeballs, the smart glasses often use a reference eye diagram as the basis to calculate the corresponding motion trajectory of the user's eyeballs at a current position. The reference eye diagram is usually acquired when a camera of the smart glasses is facing the user's eyeballs.

In the process of implementing the disclosure, the inventor found that the related art has the following defects: when a user wears a pair of smart glasses, a wearing position of the smart glasses deviates. When the user does not correct in time, the result obtained by calculating the motion trajectory of the user's eyeballs based on the reference eye diagram is low in accuracy and reliability.

SUMMARY

According to a first aspect, an embodiment of the disclosure provides smart glasses, which may include: a frame, a display assembly, an adjustable camera assembly, a sensor assembly, and a micro-controller.

In an alternative embodiment, the frame includes, a first side frame, a main frame and a second side frame connected in sequence. The first side frame and the second side frame are worn on the ears of a wearable device user. The main frame is supported in front of the eyes of the wearable device user.

In an alternative embodiment, the display assembly is fixed on the main frame, is connected to the micro-controller, and is configured to display an image.

In an alternative embodiment, the adjustable camera assembly is arranged on the main frame, is connected to the micro-controller, and is configured to acquire an eyeball image of the wearable device user and send the eyeball image to the micro-controller.

In an alternative embodiment, the sensor assembly is arranged inside the frame, is connected to the micro-controller, and is configured to acquire motion information of the smart glasses and send the motion information to the micro-controller. The motion information includes posture information and displacement information.

In an alternative embodiment, the micro-controller is arranged inside the frame, and is configured to adjust the adjustable camera assembly according to the received motion information, and determine a gaze point and gaze direction of the wearable device user according to the received eyeball image.

According to a second aspect, an embodiment of the disclosure also provides a method for Tracking Eyeball Trajectory, applied to smart glasses provided by any embodiment of the disclosure. The method may include the following steps.

In an alternative embodiment, a micro-controller receives motion information sent by a sensor assembly.

In an alternative embodiment, when the micro-controller determines that a current relative position of a camera deviates from a reference relative position of the camera according to the motion information and preset adjustment conditions, the camera is adjusted to move from the current relative position to the reference relative position according to the motion information. The reference relative position is acquired by the micro-controller when the camera is facing the eyeballs of a wearable device user.

In an alternative embodiment, the micro-controller determines a gaze point and gaze direction of the wearable device user according to an eyeball image of the wearable device user acquired by the camera based on the reference relative position.

According to a third aspect, an embodiment of the disclosure also provides a device for tracking eyeball trajectory, applied to a micro-controller provided by any embodiment of the disclosure. The device may include an information receiving module, a position adjustment module and an information acquisition module.

In an alternative embodiment, the information receiving module is configured to receive motion information sent by a sensor assembly.

In an alternative embodiment, the position adjustment module is configured to adjust, when the micro-controller determines that a current relative position of a camera deviates from a reference relative position of the camera according to the motion information and preset adjustment conditions, the camera to move from the current relative position to the reference relative position according to the motion information, the reference relative position being acquired by the micro-controller when the camera is facing the eyeballs of a wearable device user.

In an alternative embodiment, the information acquisition module is configured to determine a gaze point and gaze direction of the wearable device user according to an eyeball image of the wearable device user acquired by the camera based on the reference relative position.

According to a fourth aspect, an embodiment of the disclosure provides a computer storage medium, which may store a computer program that, when executed by a processor, implements the method for tracking eyeball trajectory provided by any embodiment of the disclosure.

DETAILED DESCRIPTION OF THE EMBODIMENTS

Figure 1:
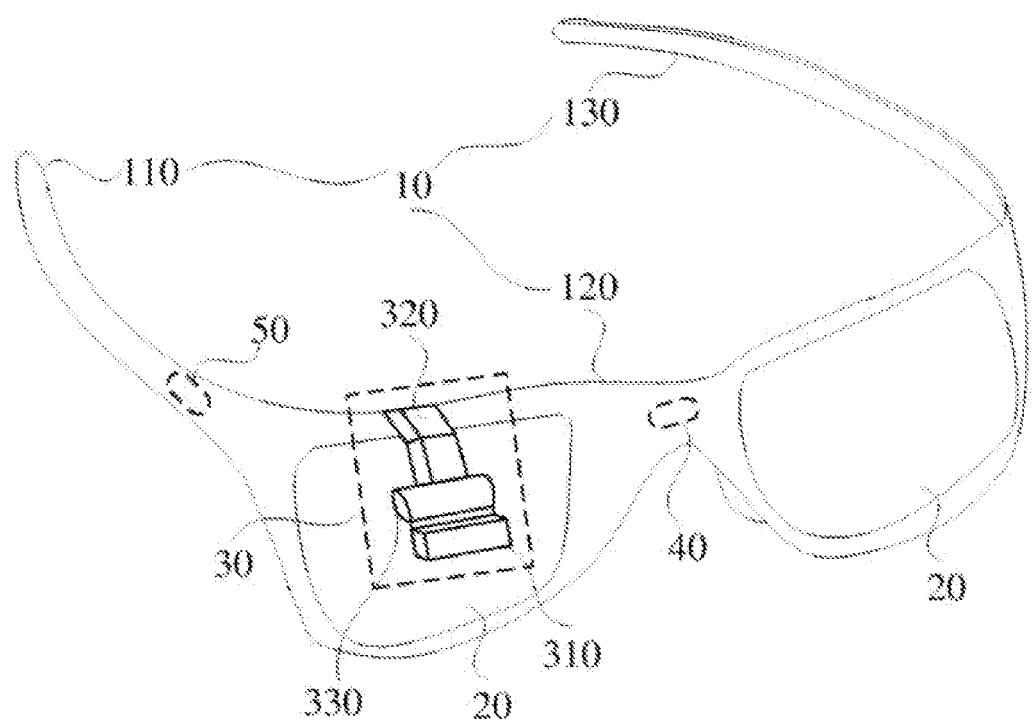
FIG. 1 is a schematic structural diagram of smart glasses according to Embodiment 1 of the disclosure.

The disclosure will be further described in detail below with reference to the accompanying drawings and embodiments. It will be appreciated that the specific embodiments described herein are merely illustrative of the disclosure and are not intended to limit the disclosure.

In addition, it is also to be noted that, for the convenience of description, parts, but not all, only related to the disclosure are shown in the drawings. Before discussing exemplary embodiments in more detail, it should be mentioned that some exemplary embodiments are described as processes or methods depicted as flowcharts. Although the flowchart describes various operations (or steps) as sequential processing, many of the operations may be implemented in parallel, concurrently, or simultaneously. In addition, the sequence of operations may be rearranged. The processing may be terminated when its operation is completed, but may also have additional steps not included in the drawings. The processing may correspond to methods, functions, procedures, subroutines, subprograms, and so on.

Embodiment 1

FIG. 1 is a schematic structural diagram of smart glasses according to Embodiment 1 of the disclosure. As shown in FIG. 1, the smart glasses may structurally include a frame 10, a display assembly 20, an adjustable camera assembly 30, a sensor assembly 40, and a micro-controller 50.

The frame 10 includes a first side frame 110, a main frame 120 and a second side frame 130 connected in sequence. The first side frame 110 and the second side frame 130 are worn on the ears of a wearable device user. The main frame 120 is supported in front of the eyes of the wearable device user. The display assembly 20 is fixed on the main frame 120, is connected to the micro-controller 50, and is configured to display an image. The adjustable camera assembly 30 is arranged on the main frame 120, is connected to the micro-controller 50, and is configured to acquire an eyeball image of the wearable device user and send the eyeball image to the micro-controller 50. The sensor assembly 40 is arranged inside the frame 10, is connected to the micro-controller 50, and is configured to acquire motion information of the smart glasses and send the motion information to the micro-controller 50. The motion information includes posture information and displacement information. The micro-controller 50 is arranged inside the frame 10, and is configured to adjust the adjustable camera assembly 30 according to the received motion information, and determine a gaze point and gaze direction of the wearable device user according to the received eyeball image.

In the embodiment of the disclosure, the first side frame 110 and the second side frame 130 are side frames of the same nature, that is, the first side frame 110 may also serve as the second side frame 130, and the second side frame 130 may also serve as the first side frame 110. The sensor assembly 40 and the micro-controller 50 may be mounted inside the side frame. The display assembly 20 may display image information. The image information includes, but is not limited to, virtual images and augmented reality images. In addition, the display assembly 20 may display the image information by displaying a lens or by displaying the image information by an electronic display projection, which is not limited in the embodiment of the disclosure. The adjustable camera assembly 30 is arranged on the main frame 120 and is also connected to the micro-controller 50 inside the frame 10. It should be noted that the adjustable camera assembly 30 may also be arranged on the first side frame 110 (or the second side frame 130), that is, a mounting position of the adjustable camera assembly 30 may be set according to actual needs, which is not limited in the embodiment of the disclosure. In addition, two sets of adjustable camera assemblies 30 may be symmetrically arranged at the upper position of the main frame 120 corresponding to the display assembly 20 (or the first side frame 110 and the second side frame 130) for tracking an eyeball trajectory (including a gaze point and a gaze direction) of the wearable device user and acquiring an external image, respectively. When it is not required to track the eyeball trajectory of the wearable device user, the adjustable camera assembly 30 may also be adjusted to the outside of the display assembly to avoid blocking the line of sight of the wearable device user. The sensor assembly 40 may be arranged inside the main frame 120 for acquiring motion information of the smart glasses. For example, when the head of the wearable device user remains upright, if a wearing position of the smart glasses is a reference wearing position, the motion information acquired by the sensor assembly is that the displacement is 0 and the offset angle is 0. The reference wearing position may be that a vertical center line of the display assembly coincides with a vertical direction and is a set distance from the eyeballs of the wearable device user (acquired when the camera is directly facing the eyeballs of the wearable device user). The reference wearing position may be automatically acquired by the smart glasses when the wearable device user starts to wear the smart glasses, and the reference wearing position may not be consistent when different wearable device users use the smart glasses and each time the wearable device user uses the smart glasses. After determining the reference wearing position, the reference relative position of the camera in the adjustable camera assembly 30 relative to the eyeballs of the wearable device user may be acquired. In addition, data acquired by the sensor assembly 40 in the embodiment of the disclosure may also be used for motion sensing games of the wearable device user. The micro-controller 50 is responsible for analyzing the specific situation of the smart glasses deviating from the reference wearing position according to the motion information sent by the sensor assembly 40, and controlling the adjustable camera assembly 30 to adjust from the current position to the reference relative position. Meanwhile, the micro-controller 50 is also responsible for receiving an eyeball image of the wearable device user sent by the adjustable camera assembly 30, and then determining a gaze point and gaze direction of the wearable device user according to the acquired eyeball image.

The working principle of the smart glasses in the embodiment of the disclosure is that: motion information of the smart glasses is acquired through a sensor assembly arranged in the smart glasses, to determine a specific situation that a current wearing position of the smart glasses deviates from a reference wearing position according to the motion information; a micro-controller in the smart glasses controls an adjustable camera assembly to be adjusted from a current position to a reference relative position according to the motion information of the smart glasses, and then tracks the eyeballs of a wearable device user; the adjustable camera assembly sends an acquired eyeball image to the micro-controller; and the micro-controller analyzes a gaze point and gaze direction of the wearable device user according to the received eyeball image.

In the embodiments of the disclosure, corresponding sensor and camera assemblies are arranged in the smart glasses, and the sensor assembly is used to acquire motion information of the smart glasses, and adjust an adjustable camera according to the motion information, so that after the camera moves from a current relative position to a reference relative position, the camera acquires an eyeball image of a wearable device user and determines a gaze point and gaze direction of the wearable device user according to the eyeball image. The problem of large errors of an eyeball trajectory calculation result caused by the inability to adjust a camera position when the existing smart glasses deviate from a wearing position is solved. A deviation position of the camera is corrected, so that it always maintains the reference relative position with the eyeballs of the wearable device user, thereby improving the accuracy and reliability of eyeball trajectory information of the wearable device user.

As shown in FIG. 1, in an optional embodiment of the disclosure, the adjustable camera assembly 30 includes a camera 310, a moving rod 320 and a rotating shaft 330. The camera 310 is mounted on the rotating shaft 330, and is configured to acquire an eyeball image of the wearable device user. The rotating shaft 330 is fixed to one end of the moving rod 320, and is configured to adjust a shooting angle of the camera 310. The moving rod 320 is connected to the first side frame 110, and is configured to adjust the position of the camera 310.

In the embodiment of the disclosure, the camera 310 may be configured with a corresponding moving rod 320 and a rotating shaft 330 to form the adjustable camera assembly 30. The moving rod 320 may move up, down, left, and right, and the camera 310 may rotate circularly around the rotating shaft 330 as a center. It can be seen that the combination of the moving rod 320 and the rotating shaft 330 can effectively adjust the position of the camera 310 relative to the eyeballs of the wearable device user.

In an optional embodiment of the disclosure, the sensor assembly includes a posture sensor and a motion sensor.

In the embodiment of the disclosure, since the purpose of the sensor assembly is to acquire the motion information of the smart glasses, specifically, the sensor assembly may use a posture sensor and a motion sensor. The posture sensor may acquire the posture (that is, deflection angle) of the smart glasses, and the motion sensor may acquire the displacement of the smart glasses. The embodiment of the disclosure does not limit the specific types of the posture sensor and the motion sensor. Any sensor that can acquire the posture information of the smart glasses can be used as the posture sensor, such as a gyroscope. Any sensor that can acquire the displacement information of the smart glasses can be used as the motion sensor. In addition, it is also possible to use a distance measuring sensor instead of the motion sensor to acquire a distance between the camera and the eyeballs of the wearable device user through the distance measuring sensor, thereby acquiring the displacement information of the camera relative to the eyeballs of the wearable device user.

Figure 2:
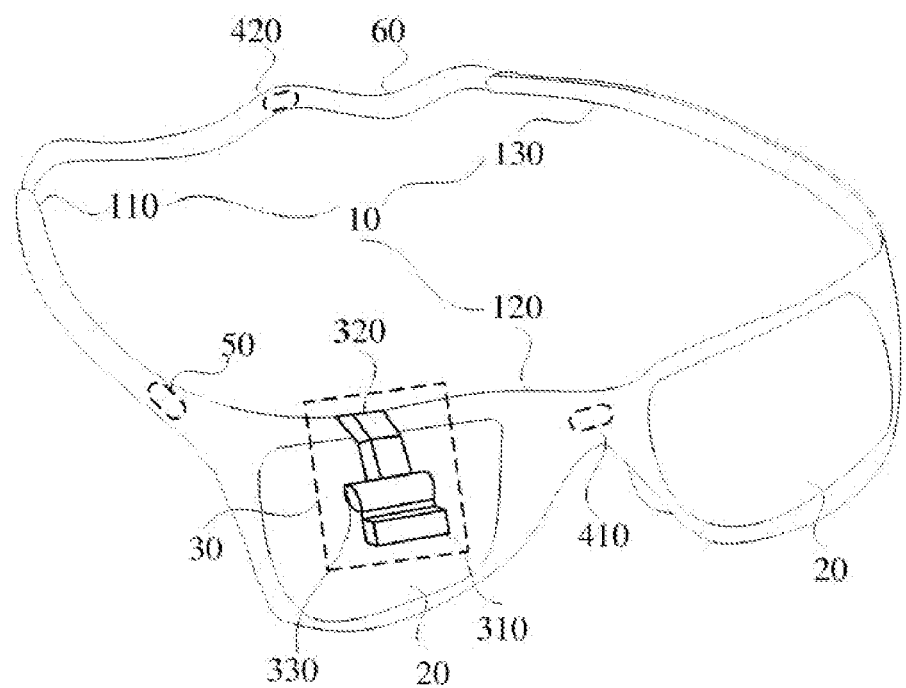
FIG. 2 is a schematic structural diagram of smart glasses according to Embodiment 1 of the disclosure.

FIG. 2 is a schematic structural diagram of smart glasses according to Embodiment 1 of the disclosure. As shown in FIG. 2, in an optional embodiment of the disclosure, the sensor assembly includes a first sensor assembly 410 and a second sensor assembly 420. The first sensor assembly 410 is arranged on a connecting belt 60 connected to the frame, and is configured to acquire motion information of the head of the wearable device user. The second sensor assembly 420 is arranged inside the main frame 120, and is configured to acquire motion information of the smart glasses.

In the process of implementing the disclosure, the inventor found that if the wearable device user always keeps the head posture unchanged while using the smart glasses, when the position of the smart glasses deviates from the reference wearing position, only one sensor assembly may be used to adjust the camera position in the smart glasses, because the motion information acquired by the sensor assembly at this time is the relative motion information of the smart glasses relative to the head of the wearable device user. If both the head of the wearable device user and the position of the smart glasses relative to the head have changed during the use of the smart glasses, only one sensor assembly cannot be used to acquire the relative position information of the smart glasses relative to the head of the wearable device user. In order to solve this problem, a second sensor assembly may be further arranged on a strap of the smart glasses. The strap of the smart glasses can be fixed at a certain position on the head of the wearable device user. Therefore, the relative position of the second sensor assembly inside the strap and the head of the wearable device user will not change, and the head motion information of the wearable device user can be accurately acquired. After acquiring absolute motion information of the smart glasses through the first sensor assembly arranged in the main frame, the relative motion information of the smart glasses relative to the head of the wearable device user may be acquired in combination with the head motion information of the wearable device user, and then the relative motion information of the camera relative to the eyeballs of the wearable device user is acquired in combination with the current position situation of the camera. Finally, according to the relative motion information of the camera relative to the eyeballs of the wearable device user, the position of the camera is adjusted so that it is located at the reference relative position to track the eyeballs of the wearable device user.

In an optional embodiment of the disclosure, the smart glasses may further include: a wireless transceiver module. The wireless transceiver module is arranged inside the frame, is connected to the micro-controller, and is configured to wirelessly communicate with an external electronic device.

The wireless transceiver module may be a Bluetooth module, a Wireless-Fidelity (Wi-Fi) module, and other types of wireless communication modules. The external electronic device may be various types of electronic devices that may receive pictures, such as smart phones, tablet computers, notebooks, or desktop computers.

Embodiment 2

Figure 3:
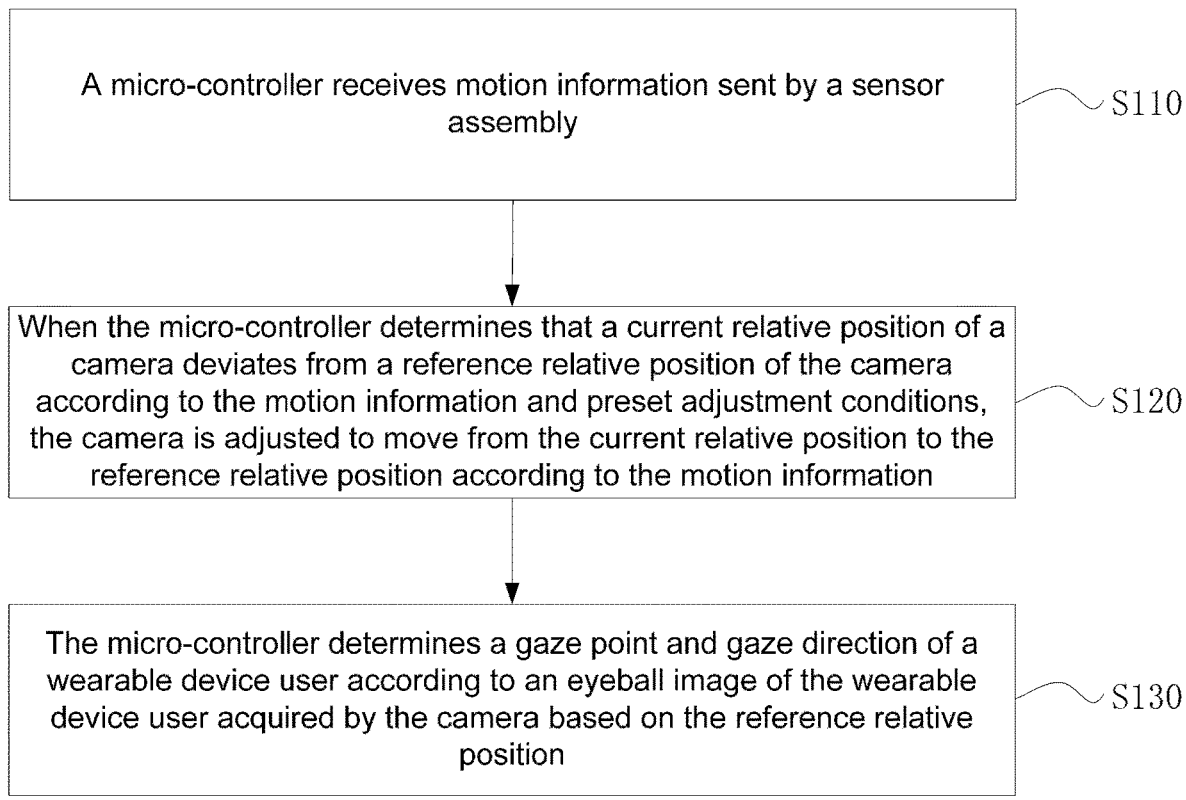
FIG. 3 is a flowchart of a method for Tracking Eyeball Trajectory according to Embodiment 2 of the disclosure.

FIG. 3 is a flowchart of a method for tracking eyeball trajectory according to Embodiment 2 of the disclosure. The method is applied to smart glasses provided by any embodiment of the disclosure. The present embodiment may be applied to a situation of adjusting a camera from a current position to a reference relative position. The method may be performed by a device for tracking eyeball trajectory. The device may be implemented by software and/or hardware. Correspondingly, as shown in FIG. 3, the method includes the following operations.

In S210, a micro-controller receives motion information sent by a sensor assembly.

The motion information includes posture information and displacement information. The smart glasses may use one or two sensor assemblies to acquire the motion information.

In S220, when the micro-controller determines that a current relative position of the camera deviates from a reference relative position of the camera according to the relative motion information and preset adjustment conditions, the camera is adjusted to move from the current relative position to the reference relative position according to the relative motion information.

The reference relative position is acquired by the micro-controller when the camera is facing the eyeballs of the wearable device user. The preset adjustment condition may be a range where the camera deviates from the reference relative position. For example, the current relative position of the camera deviates from the reference relative position by no more than 2 cm.

In the embodiment of the disclosure, if the smart glasses deviate from the reference wearing position during the wearing process, the reference relative position of the camera also deviates accordingly. If the position of the deviated camera is not adjusted in time, the acquired eyeball image of the wearable device user may be wrong. For example, if the positions of the smart glasses and the camera deviate downwards by 0.5 cm, the eyeballs of the wearable device user look down, and the gaze point also moves down by 0.5 cm, the micro-controller in the smart glasses determines that the gaze point and gaze direction of the eyeballs of the wearable device user have not moved according to the eyeball image acquired at the current position of the camera. In fact, the eyeballs of the wearable device user move downward, and it can be seen that the eyeball trajectory result of the wearable device user tracked by the smart glasses has a large error. Therefore, in order to solve this problem, when the micro-controller in the smart glasses determines that the current relative position of the camera deviates from the reference relative position of the camera according to the motion information and the preset adjustment conditions, the camera may be controlled to be adjusted from the current relative position to the reference relative position according to the motion information to avoid a calculation error caused by position deviation and a wrong eye tracking result.

It should be noted that controlling the camera to adjust from the current relative position to the reference relative position according to the motion information needs to meet preset adjustment conditions. When the range of the current relative position of the camera deviates from the reference relative position is too large, for example, the displacement of the entire smart glasses is shifted downward by 5 cm and the angle is deflected by 30°. At this time, the wearable device user will obviously feel that the wearing effect is not good, and will actively adjust the wearing position of smart glasses. Therefore, the preset adjustment condition may be set for the comfortable wearing position range of the wearable device user. When the wearing position of the smart glasses does not satisfy the preset adjustment condition, an alarm message may be sent to the wearable device user to remind the wearable device user to manually adjust the wearing position, and then the micro-controller controls the camera to be adjusted to the reference relative position.

In S230, the micro-controller determines a gaze point and gaze direction of the wearable device user according to an eyeball image of the wearable device user acquired by the camera based on the reference relative position.

Accordingly, after the camera is adjusted to the reference relative position, the eyeball image of the wearable device user acquired by the camera may be used to accurately calculate the gaze point and gaze direction of the wearable device user, thereby obtaining an eyeball trajectory with high accuracy and reliability.

In an optional embodiment of the disclosure, the motion information includes motion information of the head of the wearable device user and motion information of the smart glasses. The operation that the camera is adjusted to move from the current relative position to the reference relative position according to the motion information includes that: when the micro-controller detects that the motion information of the head of the wearable device user does not match reference head motion information, relative motion information of the smart glasses is determined according to the motion information of the head of the wearable device user and the motion information of the smart glasses; and when determining that a current relative position of the camera deviates from a reference relative position of the camera according to the relative motion information and preset adjustment conditions, the camera is adjusted to move from the current relative position to the reference relative position according to the relative motion information.

In the embodiment of the disclosure, when the smart glasses use one sensor assembly, the motion information received by the micro-controller is the relative motion information of the smart glasses relative to the head of the wearable device user. When the smart glasses use two sensor assemblies, the micro-controller may calculate the relative motion information of the smart glasses relative to the head of the wearable device user according to two pieces of motion information. For example, the motion information of the head of the wearable device user acquired by the sensor assembly is deflected downward by 30°, the motion information of the smart glasses is deflected downward by 45°, and the relative motion information of the smart glasses relative to the head of the wearable device user is deflected downward by 15°. At this time, the camera may be adjusted to the reference relative position by deflecting the camera upward by 15° from the current position.

In an optional embodiment of the disclosure, the operation that the micro-controller determines a gaze point and gaze direction of the wearable device user according to an eyeball image of the wearable device user acquired by the camera based on the reference relative position includes that: a current position eye diagram taken by the camera at the reference relative position is acquired; a pupil center position in the current position eye diagram is taken as a current pupil center position; and a gaze point and gaze direction of the wearable device user are determined according to the current pupil center position and a reference pupil center position of the wearable device user.

Specifically, when determining the gaze point and gaze direction of the wearable device user, a current position eye diagram of the eyeballs of the wearable device user may be photographed through the camera, and a pupil center position in the current position eye diagram is acquired. The pupil center position in the current position eye diagram is taken as a current pupil center position, and the current pupil center position is used as the gaze point for comparison with a reference pupil center position to determine the gaze point and gaze direction of the wearable device user.

It should be noted that, in the embodiment of the disclosure, before acquiring the current position eye diagram photographed by the camera when the eyeballs of the wearable device user are at the current position, a reference eye diagram photographed when the camera is facing the eyeballs of the wearable device user may also be acquired in advance, and a pupil center position in the reference eye diagram is taken as a reference pupil center position of the wearable device user. The reference eye diagram refers to an eye picture taken when the camera of the wearable device is facing the eyeballs of the wearable device user. The pupil center position of the eyeballs of the wearable device user in the reference eye diagram is usually located at the center of the reference eye diagram.

Correspondingly, after obtaining the current pupil center position, it may be compared with the reference pupil center position to determine a relative distance and a relative direction between the current pupil center position and the reference pupil center position. Then, according to the reference pupil center position, and the relative distance and the relative direction between the current pupil center position and the reference pupil center position, the gaze point and gaze direction of the wearable device user are determined. For example, when determining the gaze point and gaze direction of the wearable device user on the display assembly, if the reference pupil center position is at the center of the image and the current pupil center position is 1 cm directly above the center of the image, the point 1 cm directly above the center position of the display assembly may be used as the gaze point. Meanwhile, after the gaze point is determined, the gaze direction is a connection line direction between the center position of the display assembly and the gaze point position, that is, directly above. When determining the gaze point and gaze direction of the wearable device user in a real environment, the camera assembly may be used to acquire the reference eye diagram and current position eye diagram of the wearable device user, and calculate a line-of-sight direction of the wearable device user in combination with other sensors. A first contact object of the line-of-sight direction in the space or an intersection point projected on a plane may be used as the gaze point. In the embodiment of the disclosure, the gaze point and gaze direction of the wearable device user may be accurately and quickly determined by using the pupil center position.

It should be noted that the camera in the embodiment of the disclosure may be a visible light camera, an infrared thermal imaging camera, or another type of camera. In addition, determining the pupil center position from the eye diagram photographed by the camera and determining the gaze point and gaze direction of the wearable device user accordingly is a relatively mature prior art method, which will not be described in detail in the embodiments of the disclosure.

In the embodiments of the disclosure, when a micro-controller determines that a current relative position of a camera deviates from a reference relative position of the camera according to received motion information and preset adjustment conditions, the camera is adjusted to move from the current relative position to the reference relative position according to the motion information, and the micro-controller determines a gaze point and gaze direction of a wearable device user according to an eyeball image of the wearable device user acquired by the camera based on the reference relative position. The problem of large errors of an eyeball trajectory calculation result caused by the inability to adjust a camera position when the existing smart glasses deviate from a wearing position is solved. A deviation position of the camera is corrected, so that it always maintains the reference relative position with the eyeballs of the wearable device user, thereby improving the accuracy and reliability of eyeball trajectory information of the wearable device user.

Embodiment 3

Figure 4:
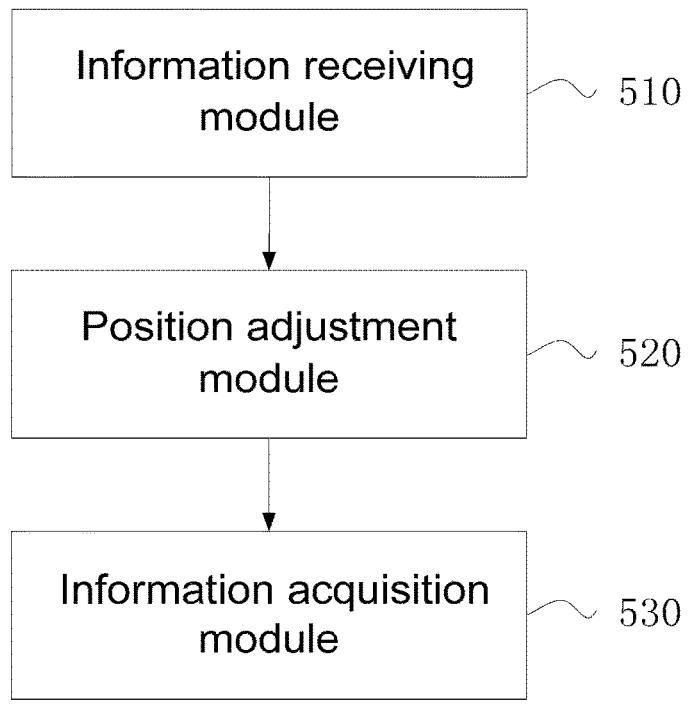
FIG. 4 is a schematic diagram of a device for tracking eyeball trajectory according to Embodiment 3 of the disclosure.

FIG. 4 is a schematic diagram of a device for tracking eyeball trajectory according to Embodiment 3 of the disclosure. The present embodiment may be applied to a situation of adjusting a camera from a current position to a reference relative position. As shown in FIG. 4, the device includes: an information receiving module 510, a position adjustment module 520 and an information acquisition module 530.

The information receiving module 510 is configured to receive motion information sent by a sensor assembly.

The position adjustment module 520 is configured to adjust, when the micro-controller determines that a current relative position of a camera deviates from a reference relative position of the camera according to the motion information and preset adjustment conditions, the camera to move from the current relative position to the reference relative position according to the motion information. The reference relative position is acquired by the micro-controller when the camera is facing the eyeballs of a wearable device user.

The information acquisition module 530 is configured to determine a gaze point and gaze direction of the wearable device user according to an eyeball image of the wearable device user acquired by the camera based on the reference relative position.

In the embodiments of the disclosure, when a micro-controller determines that a current relative position of a camera deviates from a reference relative position of the camera according to received motion information and preset adjustment conditions, the camera is adjusted to move from the current relative position to the reference relative position according to the motion information, and the micro-controller determines a gaze point and gaze direction of a wearable device user according to an eyeball image of the wearable device user acquired by the camera based on the reference relative position. The problem of large errors of an eyeball trajectory calculation result caused by the inability to adjust a camera position when the existing smart glasses deviate from a wearing position is solved. A deviation position of the camera is corrected, so that it always maintains the reference relative position with the eyeballs of the wearable device user, thereby improving the accuracy and reliability of eyeball trajectory information of the wearable device user.

Optionally, the motion information includes motion information of the head of the wearable device user and motion information of the smart glasses. The position adjustment module 520 is further configured to determine, when the micro-controller detects that the motion information of the head of the wearable device user does not match reference head motion information, relative motion information of the smart glasses according to the motion information of the head of the wearable device user and the motion information of the smart glasses, and adjust, when determining that a current relative position of the camera deviates from a reference relative position of the camera according to the relative motion information and preset adjustment conditions, the camera to move from the current relative position to the reference relative position according to the relative motion information.

Optionally, the information acquisition module 530 is further configured to acquire a current position eye diagram taken by the camera at the reference relative position, take a pupil center position in the current position eye diagram as a current pupil center position, and determine a gaze point and gaze direction of the wearable device user according to the current pupil center position and a reference pupil center position of the wearable device user.

The device for tracking eyeball trajectory may perform the method for tracking eyeball trajectory provided by any embodiment of the disclosure, and has the corresponding functional modules and beneficial effects of the execution method. For technical details that are not described in detail in the present embodiment, reference may be made to the method for tracking eyeball trajectory provided by any embodiment of the disclosure.

Embodiment 4

Embodiment 4 of the disclosure also provides a computer storage medium storing a computer program that, when executed by a computer processor, is used to perform the method for tracking eyeball trajectory according to any one of the above embodiments of the disclosure. A micro-controller receives motion information sent by a sensor assembly. When the micro-controller determines that a current relative position of a camera deviates from a reference relative position of the camera according to the motion information and preset adjustment conditions, the camera is adjusted to move from the current relative position to the reference relative position according to the motion information. The reference relative position is acquired by the micro-controller when the camera is facing the eyeballs of a wearable device user. The micro-controller determines a gaze point and gaze direction of the wearable device user according to an eyeball image of the wearable device user acquired by the camera based on the reference relative position.

The computer storage medium in the embodiments of the disclosure may adopt one or any combination of more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, device, or any combination thereof. A more specific example (non-exhaustive list) of the computer-readable storage medium may include, but is not limited to, an electric connector with one or more wires, a portable computer disk, a hard disk, a Random Access Memory (RAM), a Read Only Memory (ROM), an Erasable Programmable Read Only Memory (EPROM) (or flash memory), an optical fiber, a portable Compact Disk-Read Only Memory CD-ROM, an optical storage device, a magnetic storage device, or any suitable combination of the foregoing. The computer-readable storage medium herein may be any tangible medium that contains or stores a program. The program may be used by or in combination with an instruction execution system, or device.

The computer-readable signal medium may include a data signal that is propagated in a baseband or as part of a carrier, carrying computer-readable program codes. Such propagated data signals may take a variety of forms including, but not limited to, electromagnetic signals, optical signals, or any suitable combination of the foregoing. The computer-readable signal medium may also be any computer-readable medium other than a computer-readable storage medium, and the computer-readable medium may send, propagate, or transmit a program for use by or in connection with an instruction execution system, or device.

Program codes included in the computer-readable medium may be transmitted by any suitable medium, including but not limited to wireless, wired, optical cable, Radio Frequency (RF), etc., or any suitable combination of the foregoing.

Computer program codes for performing the operations of the disclosure may be written in one or more programming languages, or combinations thereof, including object-oriented programming languages such as Java, Smalltalk, C++, and also including conventional procedural programming languages such as "C" or similar programming languages. The program codes may be executed entirely on a user computer, partly on a user computer, as an independent software package, partly on a user computer and partly on a remote computer, or entirely on a remote computer or server. In the case of involving the remote computer, the remote computer may be connected to the user computer through any type of network, including a Local Area Network (LAN) or a Wide Area Network (WAN), or may be connected to an external computer (such as connected through the Internet using an Internet service provider).

It is to be noted that the above are only the preferred embodiments of the disclosure and the applied technical principles. Those skilled in the art will understand that the disclosure is not limited to specific embodiments described herein, and those skilled in the art can make various obvious changes, readjustments and substitutions without departing from the scope of protection of the disclosure. Therefore, although the disclosure has been described in more detail through the above embodiments, the disclosure is not limited to the above embodiments, and may include other equivalent embodiments without departing from the concept of the disclosure. The scope of the disclosure is determined by the scope of the appended claims.

INDUSTRIAL APPLICABILITY

The solution provided by the embodiments of the disclosure may be applied to the technical field of wearable devices. In the embodiments of the disclosure, corresponding sensor and camera assemblies are arranged in the smart glasses, and the sensor assembly is used to acquire motion information of the smart glasses, and adjust an adjustable camera according to the motion information, so that after the camera moves from a current relative position to a reference relative position, the camera acquires an eyeball image of a wearable device user and determines a gaze point and gaze direction of the wearable device user according to the eyeball image. A deviation position of the camera is corrected, so that it always maintains the reference relative position with the eyeballs of the wearable device user, thereby improving the accuracy and reliability of eyeball trajectory information of the wearable device user.

What is claimed is:

1. Smart glasses, comprising: a frame, a display assembly, an adjustable camera assembly, a sensor assembly, and a micro-controller, wherein
the frame comprises a first side frame, a main frame and a second side frame connected in sequence, the first side frame and the second side frame are worn on ears of a wearable device user, and the main frame is supported in front of the eyes of the wearable device user;
the display assembly is fixed on the main frame, is connected to the micro-controller, and is configured to display an image;
the adjustable camera assembly is arranged on the main frame, is connected to the micro-controller, and is configured to acquire an eyeball image of the wearable device user and send the eyeball image to the micro-controller;
the sensor assembly is arranged inside the frame, is connected to the micro-controller, and is configured to acquire motion information of the smart glasses and send the motion information to the micro-controller, the motion information comprising posture information and displacement information; and
the micro-controller is arranged inside the frame, and is configured to adjust the adjustable camera assembly according to the received motion information, and determine a gaze point and gaze direction of the wearable device user according to the received eyeball image;
wherein the sensor assembly comprises a first sensor assembly and a second sensor assembly;

the first sensor assembly is arranged on a connecting belt connected to the first side frame and the second side frame, and is configured to acquire motion information of the head of the wearable device user; and the second sensor assembly is arranged inside the main frame, and is configured to acquire motion information of the smart glasses.

2. The smart glasses as claimed in claim 1, wherein the adjustable camera assembly comprises a camera, a moving rod and a rotating shaft;

the camera is mounted on the rotating shaft, and is configured to acquire an eyeball image of the wearable device user;

the rotating shaft is fixed to one end of the moving rod, and is configured to adjust a shooting angle of the camera; and the moving rod is connected to the first side frame, and is configured to adjust the position of the camera.

3. The smart glasses as claimed in claim 1, wherein the sensor assembly comprises a posture sensor and a motion sensor.

4. The smart glasses as claimed in claim 1, further comprising: a wireless transceiver module, wherein the wireless transceiver module is arranged inside the frame, is connected to the micro-controller, and is configured to wirelessly communicate with an external electronic device.

5. A method for tracking eyeball trajectory, applied to smart glasses as claimed in claim 1, comprising:

receiving, by a micro-controller, motion information sent by a sensor assembly;

when the micro-controller determines that a current relative position of a camera deviates from a reference relative position of the camera according to the motion information and preset adjustment conditions, adjusting the camera to move from the current relative position to the reference relative position according to the motion information, wherein the reference relative position is acquired by the micro-controller when the camera is facing the eyeballs of a wearable device user; and determining, by the micro-controller, a gaze point and gaze direction of the wearable device user according to an eyeball image of the wearable device user acquired by the camera based on the reference relative position.

6. The method as claimed in claim 5, wherein the motion information comprises motion information of the head of the wearable device user and motion information of the smart glasses;

adjusting the camera to move from the current relative position to the reference relative position according to the motion information comprises:

when the micro-controller detects that the motion information of the head of the wearable device user does not match reference head motion information, determining relative motion information of the smart glasses according to the motion information of the head of the wearable device user and the motion information of the smart glasses; and when determining that a current relative position of the camera deviates from a reference relative position of the camera according to the relative motion information and preset adjustment conditions, adjusting the camera to move from the current relative position to the reference relative position according to the relative motion information.

7. The method as claimed in claim 5, wherein determining, by the micro-controller, a gaze point and gaze direction of the wearable device user according to an eyeball image of the wearable device user acquired by the camera based on the reference relative position comprises:

acquiring a current position eye diagram taken by the camera at the reference relative position;

taking a pupil center position in the current position eye diagram as a current pupil center position; and determining a gaze point and gaze direction of the wearable device user according to the current pupil center position and a reference pupil center position of the wearable device user.

8. A device for tracking eyeball trajectory, applied to a micro-controller as claimed in claim 1, comprising at least one processor; and a computer readable storage, coupled to the at least one processor and storing at least one computer executable instructions thereon, which when the at least one computer executable instructions is executed by the at least one processor, cause the at least one processor to carry out following actions:

receiving motion information sent by a sensor assembly;

adjusting, when the micro-controller determines that a current relative position of a camera deviates from a reference relative position of the camera according to the motion information and preset adjustment conditions, the camera to move from the current relative position to the reference relative position according to the motion information, wherein the reference relative position is acquired by the micro-controller when the camera is facing the eyeballs of a wearable device user; and determining a gaze point and gaze direction of the wearable device user according to an eyeball image of the wearable device user acquired by the camera based on the reference relative position.

9. A non-transitory computer storage medium, storing a computer program that, when executed by a processor, implements the method for tracking eyeball trajectory claimed in claim 6.

10. The device as claimed in claim 8, wherein the motion information comprises: motion information of the head of the wearable device user and motion information of the smart glasses; the position adjustment module is further configured to determine, when the micro-controller detects that the motion information of the head of the wearable device user does not match reference head motion information, relative motion information of the smart glasses according to the motion information of the head of the wearable device user and the motion information of the smart glasses, and adjust, when determining that a current relative position of the camera deviates from a reference relative position of the camera according to the relative motion information and preset adjustment conditions, the camera to move from the current relative position to the reference relative position according to the relative motion information.

11. The device as claimed in claim 8, the information acquisition module is further configured to acquire a current position eye diagram taken by the camera at the reference relative position, take a pupil center position in the current position eye diagram as a current pupil center position, and determine a gaze point and gaze direction of the wearable device user according to the current pupil center position and a reference pupil center position of the wearable device user.

* * * * *